United States Patent [19]

Stephany et al.

[11] Patent Number: 4,783,146
[45] Date of Patent: Nov. 8, 1988

[54] LIQUID CRYSTAL PRINT BAR

[75] Inventors: Joseph F. Stephany, Williamson; Andras I. Lakatos, Penfield; Virgil J. Hull, Perinton; Alain E. Perregaux, Pittsford, all of N.Y.

[73] Assignee: Xerox Corporation, Stamford, Conn.

[21] Appl. No.: 4,932

[22] Filed: Jan. 20, 1987

[51] Int. Cl.[4] ............................................. G02F 1/13
[52] U.S. Cl. ............................... 350/331 R; 350/332; 350/336; 346/160
[58] Field of Search ................... 350/331 R, 332, 336; 358/300, 302; 346/107 R, 108, 160

[56] References Cited

U.S. PATENT DOCUMENTS

| | | | |
|---|---|---|---|
| 3,438,057 | 4/1969 | Neitzel | 346/107 |
| 3,850,517 | 11/1974 | Stephany et al. | 354/12 |
| 3,936,172 | 2/1976 | McVeigh | 355/3 R |
| 3,967,893 | 7/1976 | Majewicz | 355/4 |
| 4,385,292 | 5/1983 | Nonomura et al. | 340/719 |
| 4,386,352 | 5/1983 | Nonomura et al. | 340/784 |
| 4,403,217 | 9/1983 | Becker et al. | 340/718 |
| 4,545,672 | 10/1985 | Ozawa | 350/331 R X |
| 4,595,259 | 6/1986 | Perregaux | 350/341 X |
| 4,636,817 | 1/1987 | Masaki | 346/160 |
| 4,653,859 | 3/1987 | Masaki | 350/336 X |
| 4,692,779 | 9/1987 | Ando et al. | 346/160 X |
| 4,697,910 | 10/1987 | Kasuya | 346/160 X |

OTHER PUBLICATIONS

SID '85 Digest, Pages 373–376 dated May 1985—Title: "Print Head with Ferroelectric Liquid:Crystal Light—Shutter Array".

SID '86 Digest, Pages 263–265 by G-H Mode—Title: "Development of High-Speed and High-Resolution Liquid-Crystal Shutter (LCS) for Printers Based on Dual Frequency."

Technology dated May 1986—Article Title: "How Liquid Crystal Shutters Are Used for Light Control in Non-Impact Printers".

IBM Technical Disclosure Bulletin, vol. 13, No. 12, May 1971, Title: "Scanner Using Linear Array of Light-Emitting Diode."

*Primary Examiner*—Stanley D. Miller
*Assistant Examiner*—Richard Gallivan
*Attorney, Agent, or Firm*—Ronald F. Chapuran

[57] ABSTRACT

A linear array of liquid crystal shutters mounted near a photoreceptor surface and arranged transversely to the direction of travel of the photoreceptor surface, an array of thin film transistors connected to the array of liquid crystal shutters for electrically driving the shutters and logic means connected to the array of thin film transistors selectively pulsing the liquid crystal shutters to selectively expose the photoreceptor surface a line at a time. The system further includes circuit means for producing an electric field between the opposed electrodes of each of the liquid crystal shutters to prevent passage of light through the shutters and means for selectively de-energizing each of the pairs of electrodes for predetermined time period in response to the receipt of input data signals.

11 Claims, 6 Drawing Sheets

LIQUID CRYSTAL PRINT BAR

BACKGROUND OF THE INVENTION

1. Field of Invention

The present invention relates to liquid crystal devices used in printers, and in particular to a liquid crystal print bar using thin film transistors and transient response.

1. Description of the Prior Art

Print bars are rapidly becoming a necessary component in printers and multifunction electronic reprographic systems. The optical print bar offers the convenience of making the office copier serve as a computer printout device while still retaining its use as a copier. It is also possible to use the copier in facsimile transmissions. The use of liquid crystals in various configurations is well known. For example, U.S. Pat. No. 4,385,292 discloses a segmented liquid crystal display and a system for driving the display comprising thin film transistors coupled to a plurality of segmented display electrodes. U.S. Pat. No. 4,386,352 discloses a matrix liquid crystal display comprising a thin film transistor array and U.S. Pat. No. 4,403,217 discloses a multiplex liquid crystal display, the display comprising a thin film dielectric layer. U.S. Pat. No. 3,936,172 teaches the use of a liquid crystal material at the platen station in a reproduction machine to mask predetermined regions of an original document.

It is also known to use light emitting diodes (LED's) in alpha numeric devices. For example, IBM Technical Disclosure Bulletin, Vol. 13, No. 12, May 1971, teaches the selective excitation of light emitting diodes by a computer to produce image patterns. In addition, U.S. Pat. No. 3,438,057 discloses the parallel excitation of selected ones of a plurality of solid state light emitters mounted in a linear array in registration with a recording station to record multi-channel data on a photographic film. U.S. Pat. No. 3,850,517 uses a row of LED's and the motion of a photoconductor for vertical scan. Other uses of an array of solid state light emitters are to illuminate a document as disclosed in U.S. Pat. No. 3,967,893.

It is also known to provide a printhead with a ferroelectric liquid crystal light shutter array. The head is constructed from a florescent lamp, a light shutter array using liquid crystals and a focusing lens as disclosed in SID'85 Digest, pages 373-376, dated May 1985. In addition, SID '86 Digest, pages 263-265 discloses a liquid crystal shutter for a printer based on a dual frequency addressed G. H Mode and the publication, Technology, dated May 1986, generally discloses the use of liquid crystal shutters for light control and non-impact printers.

A difficulty with the prior art print bars is generally the complexity and cost of the print bar as well as the difficulty in obtaining high resolution and speed when used as a printer.

It is an object of the present invention, therefore, to provide a new and improved print bar using liquid crystal shutters. Another object of the present invention is to provide a liquid crystal array print bar incorporating thin film transistor drivers for high multiplexability, speed and reduced cost. It is still another object of the present invention to drive each liquid crystal picture element with a separate thin film transistor and then multiplex the input signals to the thin film transistors. It is still another object of the present invention to use the transient electro-optic effect within the liquid crystal shutters to increase the printing speed at which the liquid crystal print bar can operate. It is still another object of the present invention to simplify the system and reduce cost by the use of two voltage level drivers to avoid the complication of using three or more voltage level drivers. Further objects and advantages of the present invention will become apparent as the following description proceeds and the features characterizing the invention will be pointed out with particularity in the claims next to a forming a part of this specification.

SUMMARY OF THE INVENTION

The present invention is a linear array of liquid crystal cells or shutters mounted adjacent to a photoreceptor surface and arranged transversely to the direction of travel of the photoreceptor surface, an array of thin film transistors connected to the array of liquid crystal shutters for electrically driving the shutters, and logic means connected to the array of thin film transistors selectively pulsing the liquid crystal shutters to selectively expose the photoreceptor surface a line at a time. The system further includes circuit means for producing an electric field between the opposed electrodes of each of the liquid crystal shutters to prevent passage of light through the shutters and means for selectively de-energizing each of the pairs of electrodes for predetermined time period in response to the receipt of input data signals.

BRIEF DESCRIPTION OF THE DRAWINGS

For a better understanding of the present invention, reference may be had to the accompanying drawings wherein the same reference numerals have been applied to like parts and wherein.

DESCRIPTION OF THE INVENTION

Figure 1:
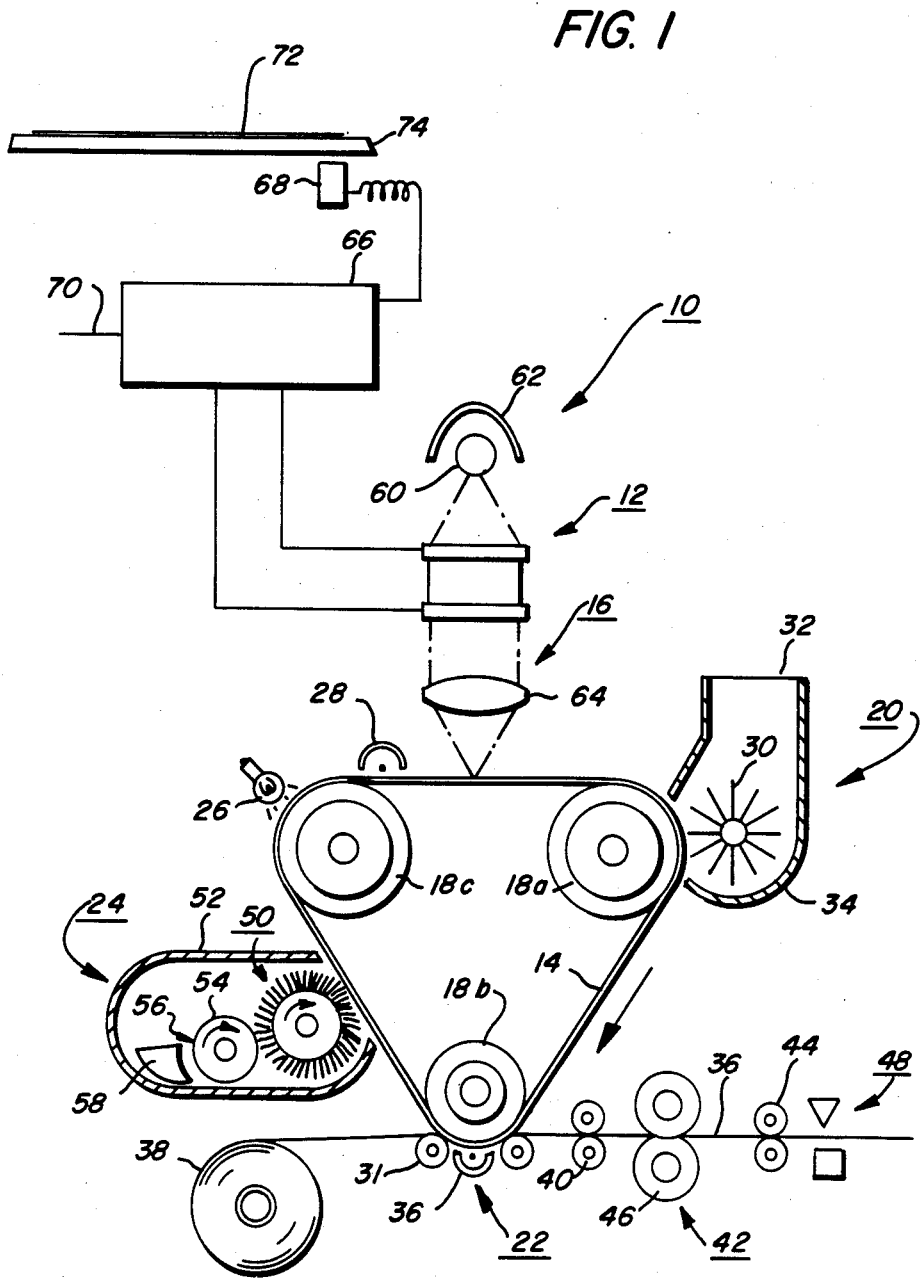
FIG. 1 illustrates the overall printer configuration.

Referring to the system diagram of FIG. 1, there is shown an electrophotographic printer 10 utilizing a liquid crystal image bar 12. The printer 10 includes a series of process stations through which a photoconductive member 14 in the form of a endless belt passes.

Beginning with the imaging station 16, whereat the latent electrostatic image is formed, the photoconductive member 14 proceeds in the direction of the arrow around the guide rollers 18a, 18b and 18c, past development station 20, transfer station 22, cleaning station 24, erase lamp 26 and precharging corona generating device 28 prior to returning to the imaging station. At development station 20, a rotating magnet brush or paddle wheel 30, housed in hopper 32, presents toner particles 34 onto the surface of the photoconductive member 14 as it moves around guide roller 18a. The toner particles 34 are charged with a polarity opposite the charges placed on the photoconductive member by the corona generating device 28 by means well known in the art by either triboelectric charging technique or by a corona generating device (not shown) or both. The toner particles are attracted and held by the latent electrostatic image recorded on the photoconductive member at the imaging station, thus developing and rendering the latent image visible. The developed image is transferred to a permanent material 36, such as paper, at the transfer station 22. After the developed image is transferred, the photoconductive member proceeds past the cleaning station 24 where all residual toner particles are removed.

Paper is provided by supply roll 38 which is pulled through the transfer station via drive rolls 40 and through a toner particle fusing station 42 by drive rolls 44, where the developed image on the paper is permanently fixed thereto by means well known in the prior art, such as, by fusing rolls 46 which apply heat and pressure to the developed image. Cutter assembly 48 cuts the paper 36 with the fixed images into separate sheets as the paper moves into a collection tray or sorter (not shown). Subsequent to the developed image transfer, the photoconductive member 14 is moved past the cleaning station 24, which removes any residual toner particles not transferred to the paper. A soft rotating brush 50, housed in chamber 52, removes the residual toner from the photoconductive member 14 and a single conductive, electrically biased roll 54 is used to remove the toner particles from the brush 50. A conventional flicker bar (not shown) is arranged to assist in toner particles removal from the soft brush and a doctor blade 56 is used on the biased roll 54 to scape the toner particles therefrom into a collecting tray 58, so that the toner particles collected may be reused if that is desired.

The imaging station comprises a light source 60 and reflector 62 which illuminates a liquid crystal image bar 12. It should also be noted that a small light source with a fiber optic array type optical coupler could be used. Light selectively passed through the image bar is focused by lens means 64 which may be one or more single lens, a Selfoc (Nippon Glass trademark lens system or a plurality of miniature lens associated with fiber optics. The image bar 12 selectively passes light to form latent electrostatic images one line at a time by erasing or discharging the image background areas. The image bar is formed by a single row of dot shutters actuated by selective application of a voltage to the plurality of electrodes on one of the substrates of the image bar. It should be noted that there also may be multiple rows of staggered dot shutters. An electronic controller or microcomputer 66 energizes the appropriate electrodes in response to digitized data from a scanning means such as a charged coupled device (CCD) linear image sensors 68 or digitized data from a source outside the printer 10, for example, from a character generator, computer or other means for storing and retrieving data via conductor 70. If a scanning CCD or a linear image sensor is used, it scans one line of information at a time from a stationary document 72 placed on a transparent, fixed platen 74. The CCD or image sensor scanning speed is substantially the same as the speed of the photoconductive member if real time imaging is to occur. Otherwise, a means for storing the document digitized data would have to be included in the electronic controller.

Figure 2:
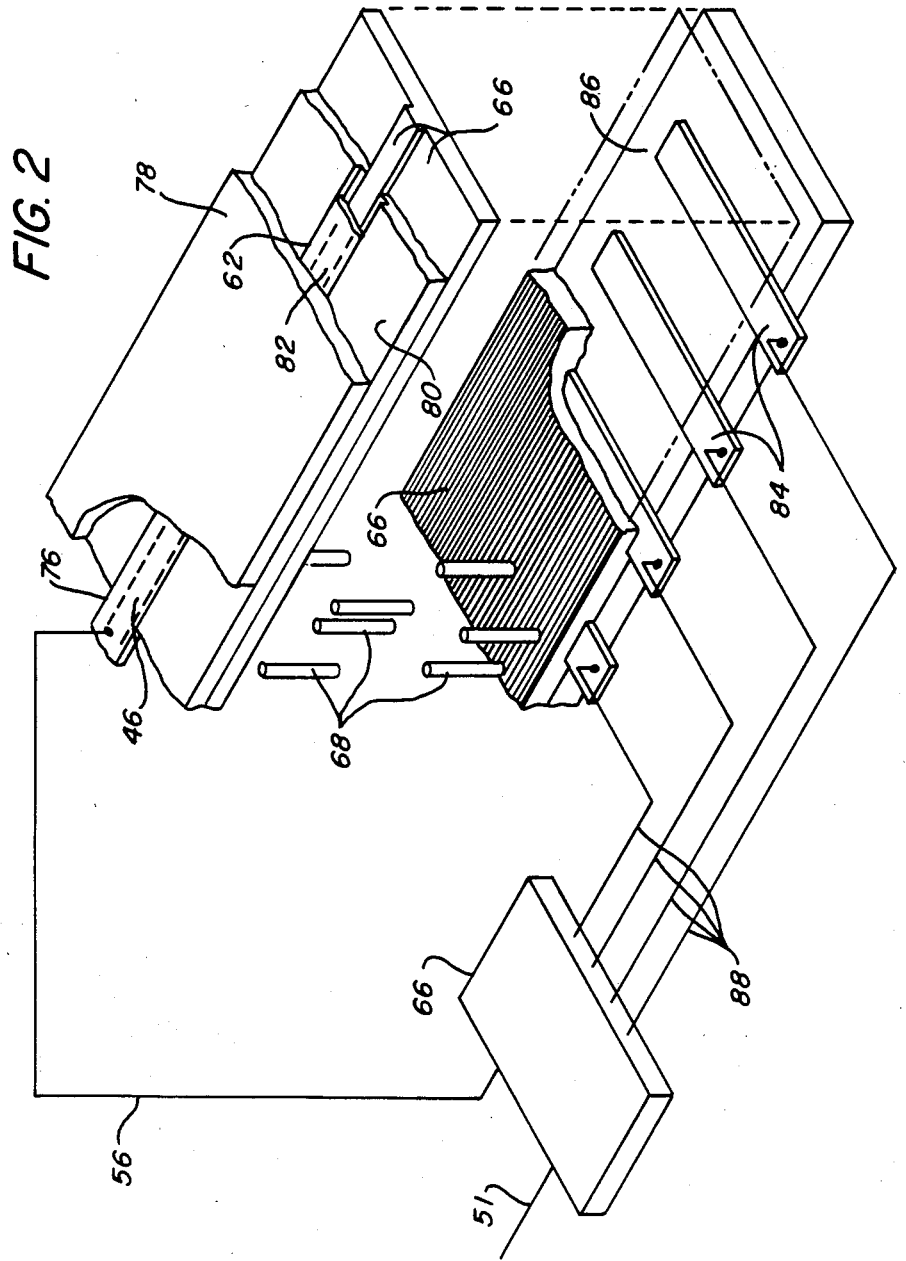
FIG. 2 illustrates the detail of a typical print bar.

FIG. 2 shows schematically a single electrode configuration of an image bar typical of the type of image bar used in the present invention. A plurality of transparent electrodes 76 could run the length of the inner surface of the upper glass substrate 78 although only one is illustrated. Light shield 80 covers the inner surface of glass substrate 78 and overlaps the edges of electrodes 76 so that a slit 82 is centrally formed along the length of the electrode 76. A plurality of transparent, parallel electrodes 84 are formed on the inner surface of the lower glass substrate 86. The plurality of electrodes 84 are equally spaced from each other and are perpendicular to the electrode 76. The density of the plurality of electrodes is about 12 per millimeter, up to as high as 40 per millimeter if desired, thus forming one single array of dot shutters to be used as an image bar to produce latent electrostatic images on a photoconductive member. The electronic controller 66 is connected to the electrodes 84, 76 via leads 88 and 56; electrode 76 is connected to a voltage selected by the controller 66. The plurality of electrodes 84 are generally connected to suitably drivers providing a 50 volt RMS square wave at a frequency of 5 to 15 KHz until light from source 60 is to be transmitted, whereupon the applied voltage to the desired electrode 84 is interrupted to transmit light to the photoconductor 14 or not interrupted when no light is to be transmitted. For further details of the liquid crystal image bar, reference is made to U.S. Pat. No. 4,595,259 incorporated herein.

In general, there are three embodiments of the present invention. The first embodiment uses the X axis drivers to provide a "set-up" voltage for the purpose of using the transient effect in the liquid crystal. This is done in order that a single one-piece backplane can be used. The use of a blocking layer to inhibit the flow of direct current, thereby preventing deterioration of the liquid crystal, enables the use of two voltage level drivers instead of three. However, three-level operation of the drivers can be implemented if necessary. In the second embodiment, the backplane is divided into a number of strips for the purpose of multiplexing the drivers and the set up voltage can be applied to the various backplane segments and thereby relieve the drivers of providing that function.

However, this configuration requires making a number of connections to the backplane equal to the multiplex factor and providing a driver chip, but simplifies the configuration of the sequencing of the Y axis and lengthens the duration for charging the pixel. The third embodiment makes use of a mode of operation of the Thin Film Transistor (TFT) that depends upon achieving reduced leakage in the TFT. The main advantage of this embodiment is the reduction of the applied voltages to gate the TFTs as well as the possibility of applying an alternating voltage of high frequency, 5 to 15 KHz, to the liquid crystal without needing three level drivers.

Figure 3:
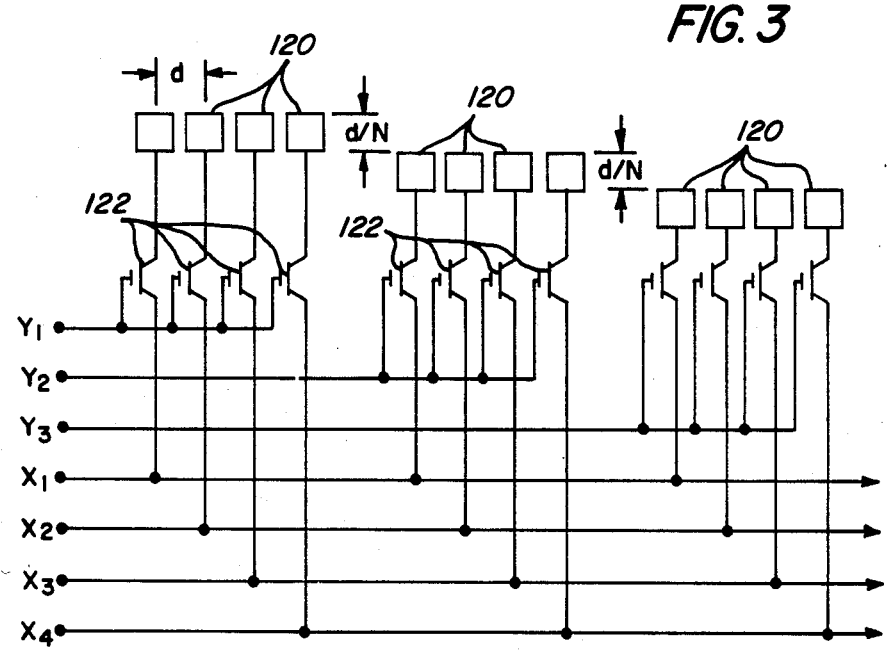
FIG. 3 illustrates the arrangement of the thin film transistors (TFT's) and liquid crystal cells in accordance with the present invention.

For the first embodiment, with reference to FIG. 3, the arrangement of the TFTs and liquid crystal pixels used are illustrated. A plurality of liquid crystal elements represented by pixel pads 120 are driven by a plurality of TFT's 122. Each pixel pad 120 is driven by one TFT 122. Assuming that a multiplex ratio of N is used, the TFTs are blocked off in N groups, in the example in FIG. 3, three groups of four TFTs each. Within each group, all the gates of the four TFTs are made common, illustrated at ($Y_1$, $Y_2$, $Y_3$), while the sources run to a number of busses equal to the number in each group illustrated at $X_1$, $X_2$, $X_3$ and $X_4$. Three such groups of four pixels each have been shown, but in the invention a much larger multiplex ratio would be used, typically 20 to 64. It is not necessary to make the number of groups equal to the number of pixels in each group, although by doing this the greatest reduction in the total number of X and Y busses would occur. In actual practice it is desirable to make the number of Y busses less than the number of X busses to reduce the turn-on times and current peaks as well as the need to provide extremely shot driving voltages to the X and Y busses.

Also in FIG. 3, each group of pixels have been displaced a distance of d/N below the group preceding it, where d is the distance between pixels as shown. This is done to bring the variously printed pixel groups into alignment after the completion of the printing of one line in actual practice is is not necessary to make this displacement. Due to the high value of N that will be used, it is only necessary to tilt the entire line by one pixel (d) relative to the photoreceptor surface. The effect of the lack of the individual displacements within each group would hardly be noticed in the practical case.

Figure 4:
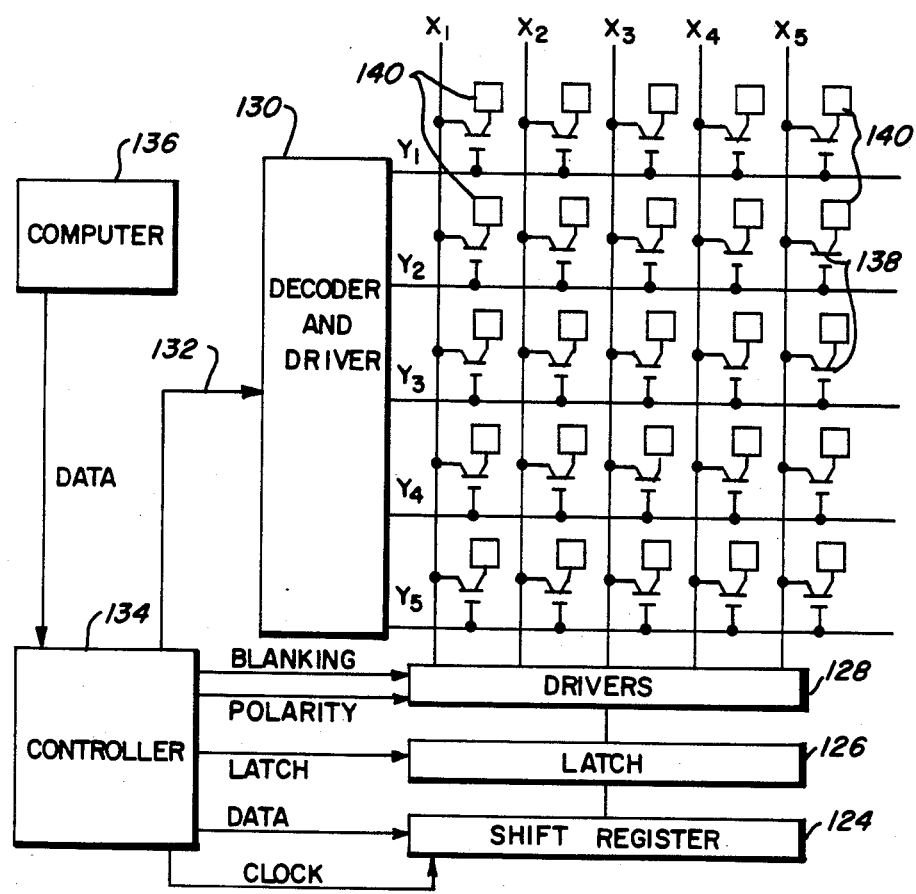
FIG. 4 is a block diagram of the control of a print bar liquid crystal and TFT array in accordance with the present invention.

FIG. 4 shows a block diagram of the system control. The line of pixels have been arranged in a square matrix for diagrammatical purposes only. Physically, the pixels are in single row. The vertical or X busses $X_1$-$X_5$ are addressed with a combination of a shift register 124, latch 126 and drivers 128. The drivers 128 may be either two or three level drivers, the two-level drives being required if a blocking layer is present in the liquid crystal cell, while the three-level drivers being required without a blocking layer. The horizontal or Y busses $Y_1$-$Y_5$ are addressed with a decoder and driver 130 in place of the usual shift register and latch. Since the addressing of the Y axis may be in a non-sequential manner, a shift register on the Y axis cannot be used.

The decoder and driver are addressed by a suitable signal 132 from controller 134 which also provides both blanking and polarity signals to the drivers 128, a latch signal to latch 126 and data and clock signals to shift register 124. The controller 134 receives the data input from any suitable source such as computer 136. The data consists of rows of bit-mapped information to be printed.

At the intersection of each X and Y bus a TFT exists which is connected to a pixel pad 140 in contact with a liquid crystal. A backplane (not shown) covers the entire square matrix and is grounded. No constant voltage is allowed on the backplane, since this voltage would allow a current to leak through the liquid crystal whether or not the TFT is on or off, and turn on all pixels. The reason for this leakthrough is the small leakage current that each TFT presently has, not the leakage of the liquid crystal.

In operation, for the transient effect, it is first necessary to "set-up" the alignment of a line of the liquid crystal array by applying a voltage to all elements of the line. In FIG. 4, assume that line Y3 is being set up. Line Y3 is strobed by applying a voltage on the Y3 line and simultaneously turning on all the X drivers by means of a blanking input. It should be noted that driver chips in present use have both a blanking and a polarity output selector and may thus easily have either all drivers turned on or off without upsetting any information stored within the chip, either in the latch 126 or shift register 124. The duration of this voltage is less than the duration of the multiplex and is typically not greater than $\frac{1}{2}(T_o/N)$ where $T_o$ is the time necessary to display one raster line.

In the next step, on/off data, previously loaded into the X axis shift register 124, is latched to the drivers 128 and the blanking bus turned off. The data to be printed in line Y1, for example, is now available on the X axis. Simultaneously to this, line Y1 is turned on by the decoder of driver 30. Line Y1 has had a set up voltage previously applied in the same manner as line Y3, but some time earlier. The data to line Y1 is held for a duration of $\frac{1}{2}(T_o/N)$ or longer, thus optically allowing light to reach the photoreceptor surface for a duration of less than $T_o$.

Figure 5:
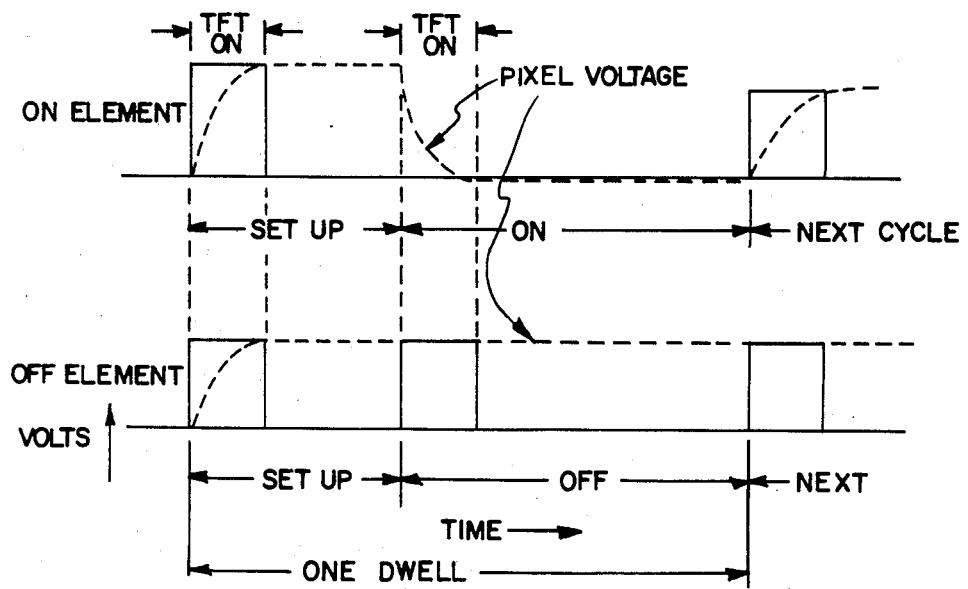
FIG. 5 illustrates the timing signals for the "On" and "Off" condition of the print bar.

FIG. 5 illustrates the wave shapes for the optically "on" and "off" condition. The setup procedure for both is identical. The voltage applied from the X axis is shown as a solid line and the actual voltage on the pixel pad as a dotted line. In the "on" case, when the liquid crystal cell is transparent, the setup voltage is followed by a period during which the TET 138 is turned on but no voltage is applied on the X axis. This allows the charge, previously applied during the setup time to leak back through the TFT 138 and thereby discharge the pixel. It may be necessary to apply small permanent bias to the TFT 138 either on the X or Y axis to select the proper operating point for this to occur. In printing the following line, the same process is repeated, assuming that the pixel is to remain on, but the polarity may either be the same, in the blocking layer case, or may be reversed if no blocking layer is used.

In the case that the pixel is off, another voltage pulse is applied during the write cycle and the element remains off. This voltage pulse does not charge the element, but is applied merely to prevent discharge through the TFT. It should be noted that all elements with a setup voltage applied to them are in the optical off state during that time for a duration after that time until the voltage is removed. The voltage is removed either by turning on the TFT with no X voltage applied to discharge the pixel, or until the charge on the pixel leaks away through the liquid crystal or the TFT itself. It should be noted that an image bar can be used when either the charged or discharged areas are developed.

Figure 6:
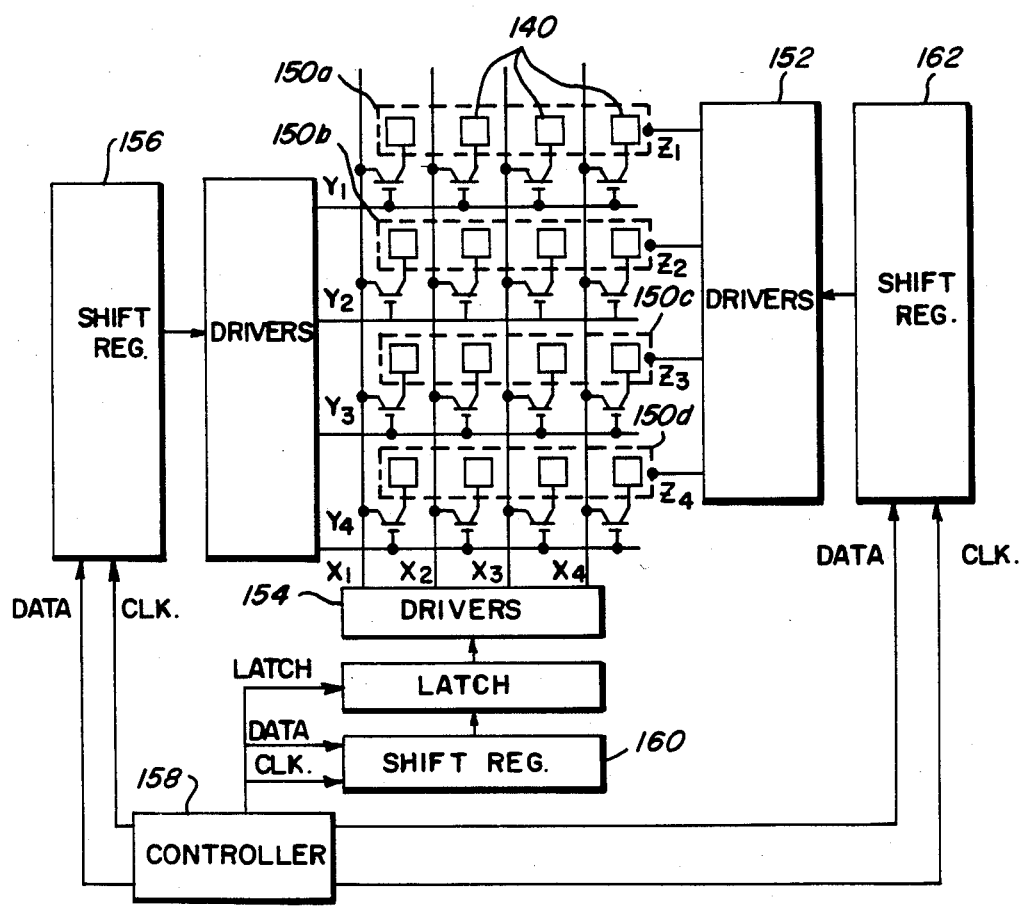
FIG. 6 illustrates a second embodiment of the control of the TFT and the liquid crystal array in accordance with the present invention.

In the second embodiment of the invention with reference to FIG. 6, the backplane, which had previously been a single plane, is cut into strpes 150a, 150b, 150c and 150d equal to the number of Y elements (equal to N). Each element now is driven by Z axis drivers $Z_1$, $Z_2$, $Z_3$ and $Z_4$ collectively shown at 152, also equal to N in number, connected to backplane stripes 150a-150d respectively. The X axis drivers $X_1$-$X_4$ illustrated as 154 are 2 level drivers, and the Y axis now has a shift register 156 instead of a decoder.

The operation is considerably simplified. The data from controller 158 is fed into the X axis shift register 160 an the appropriate Y line strobed in sequence, much in the same manner as an ordinary LC display device. The setup of each row has been previously accomplished by driving the Z axis ahead of the gating of the Y axis driver $Y_1$, $Y_2$, $Y_3$ or $Y_4$ for that line. It is thus being that the synchronization of the setup and the strobe has been accomplished by running the Z axis shift register 162 ahead of the Y axis shift register 156. Thus, the setup of the line, and the strobing are entirely independent.

Figure 7:
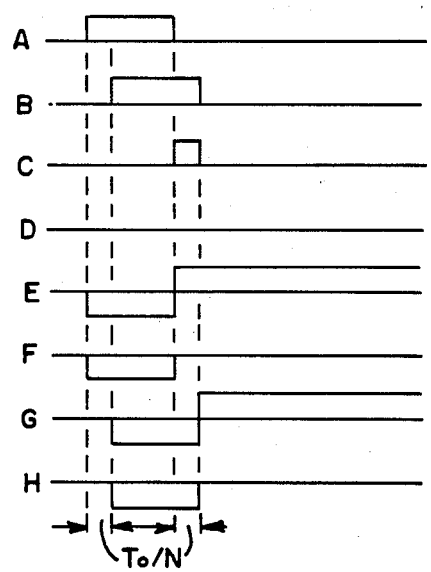
FIGS. 7a through 7h illustrate the timing wave forms for the control as illustrated in FIG. 7.

The waveforms of this arrangement are shown in FIGS. 7a–7h. FIG. 7a shows the voltage applied from the backplane, say line $Y_3$, which is backplane driver $Z_3$. The TFT is not turned on, and the pixel pad driven by the TFT will remain at approximately zero potential because of the distribution of capacities and because the leakage of the liquid crystal is less than the TFT. As a consequence, the liquid crystal under the pixel pad 140 will have the voltage applied from the Z axis across it. This must be applied for an appreciable fraction of a dwell period for proper setup to occur. In order to accomplish this, the Z axis shift register 162 is run ahead of the Y axis shift register which lengthens this pulse and allows overlapping setup pulses to be simultaneously applied to more than one backplane line. In contrast to this, the Y axis shift register 156 would always be operated a fixed number of bits behind the Z axis shift register.

FIG. 7b shows the voltage backplane pulse applied to the next backplane in sequence, and is displaced by $T_o/N$. It should be noted that the width of this pulse is considerably wider than $T_o/N$ and both pulses are partially overlapping. FIG. 7c shows the voltage applied by the X axis driver to a single element that will be retained optically off. In the case that the element is to be "on", no voltage is applied as in FIG. 7d. FIG. 7e shows the resultant voltage applied to an off pixel of line 3 and FIG. 7f shows the voltage applied to an off element on line 3. Similarly, the off and on pixels of line 4 are shown in FIGS. 7g and 7h, respectively.

The main advantage of the embodiment of FIG. 6 over the embodiment of FIG. 4, is the fact that the duration of the voltage applied is longer, being several units of $T_o/N$ instead of $\frac{1}{2}(T_o/N)$, or less.

Figure 8A:
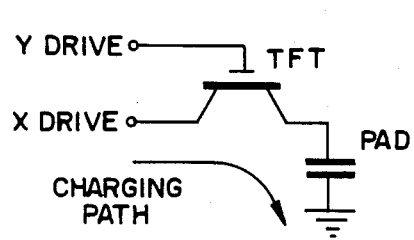
FIGS. 8a and 8b illustrate another mode of operation in accordance with the present invention.
Figure 8B:
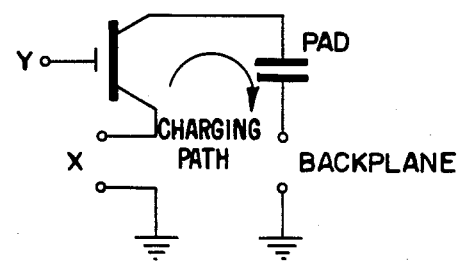

In the previous two embodiments, the TFT has been operating in the pass transistor mode. As a consequence of this, all the voltage and power necessary to charge or discharge a pixel must come from the X axis drivers. Another mode is possible. If, in the configuration of the embodiment of FIG. 4, voltage on the backplane is applied and assuming that the TFTs, when off, do not have sufficient leakage to charge the pixel pad, the X and Y drivers may be reduced in voltage to the point that the TFT is merely turned on and off, without the X axis supplying the charging current and voltage which is shown in FIGS. 8a and 8b. It should be pointed out that the configuration is identical to the embodiment on FIG. 3, and only the applied voltages are different.

The operation of the TFT in this amplifier mode has the advantage that the X and Y voltages are greatly reduced. Further, it is possible to apply an alternating voltage to the backplane, which is the source of charging current, so that the voltage gated to the liquid crystal is alternating instead of a DC pulse, thereby eliminating the need for blocking layer operation. It is possible to make use of this amplifier mode in the embodiment of FIG. 4 only if the distribution of setup pulse would occur across the liquid crystal but not across the TFTs.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

We claim:

1. Apparatus for projecting data on a photoreceptor surface comprising:
    drive means for moving the photoreceptor surface,
    a linear, optical writing station arranged transversely to the direction of travel of the photoreceptor surface including an array of liquid crystal devices mounted adjacent to the photoreceptor surface, said liquid crystal devices being arranged along two parallel lines with the location of the liquid crystal devices of the second line being staggered relative to the location of the liquid crystal devices of the first line, said array extending over a linear extent equivalent to the width of said photoreceptor surface onto which data is to be projected,
    an array of thin film transistors connected to the array of liquid crystal devices for electrically driving said devices,
    a source of light for projecting light onto said liquid crystal devices,
    means to focus said light onto the photoreceptor surface from the liquid crystal device, and
    logic means electrically connected to the array of thin film transistors for selectively pulsing said array of liquid crystal devices whereby said photoreceptor surface is selectively exposed by light from said light source.

2. The apparatus of claim 1 wherein said thin film transistors are amorphous or polycrystalline silicon.

3. The apparatus of claim 1 wherein said photoreceptor surface is exposed a line at a time.

4. An improved control for a liquid crystal image bar for use in a printer of the type having a moving photoconductive member, comprising:
    first and second glass substrates,
    a first plurality of transparent electrodes being located on the first glass substrate and a second plurality of transparent electrodes being located on the second glass substrate,
    polarizers being positioned on each of the glass substrates,
    an illuminating means for directing light towards one of the polarizers,
    an alternating voltage source, and
    multiplexed array of thin film transistors connected between the voltage source and the electrodes to selectively pulse said electrodes to form an image on the photoconductive member.

5. The control of claim 4 including circuit means for energizing the electrodes on the second glass substrate from the voltage source to produce an electric field between the first plurality and the second plurality of electrodes in order to prevent the passage of light through the image bar, and means for selectively de-energizing each of the plurality of electrodes on the second glass substrate for a predetermined time period.

6. Apparatus for projecting data on a photoreceptor surface comprising:
    drive means for moving the photoreceptor surface,
    a linear, optical writing station arranged transversely to the direction of travel of the photoreceptor surface including an array of liquid crystal devices mounted adjacent to the photoreceptor surface,
    an array of thin film transistors connected to the array of liquid crystal devices for electrically driving said devices,
    a source of light for projecting light onto said liquid crystal devices, means to focus said light onto the photoreceptor surface from the liquid crystal device, and logic means electrically connected to the array of thin film transistors for selective pulsing of said array of liquid crystal devices whereby said photoreceptor surface is selectively exposed by light from said light source.

7. The apparatus of claim 6 wherein said liquid crystal devices are arranged along two parallel lines with the location of the liquid crystal devices of the second line being staggered relative to the location of the liquid crystal devices of the first line, said array extending over a linear extent equivalent to the width of said photoreceptor surface onto which data is to be projected.

8. The apparatus of claim 7 wherein the first line comprises odd bits and the second line even bits.

9. The apparatus of claim 7 wherein the first line comprises a first density of bits and the second line comprises a second density of bits, said first density being different from said second density.

10. The apparatus of claim 7 including means to selectively deenergize a liquid crystal device of said array of liquid crystal devices for a predetermined period of time to expose said photoreceptor surface.

11. Apparatus for projecting data on a photoreceptor surface comprising:

drive means for moving the photoreceptor surface, a linear, optical writing station arranged transversely to the direction of travel of the photoreceptor surface including on array of liquid crystal devices mounted adjacent to the photoreceptor surface, said liquid crystal devices being arranged along two parallel lines with the location of the liquid crystal devices of the second line being staggered relative to the location of the liquid crystal devices of the first line, said array extending over a linear extent equivalent to the width of said photoreceptor surface onto which data is to be projected, the first line comprising a first density of bits and the second line comprising a second density of bits, said first density being different from said second density, an array of thin film transistors connected to the array of liquid crystal devices for electrically driving said devices, a source of light for projecting light onto said liquid crystal devices, means to focus said light onto the photoreceptor surface from the liquid crystal device, and logic means electrically connected to the array of thin film transistors for selective pulsing said array of liquid crystal devices whereby said photoreceptor surface is selectively exposed by light from said light source.

* * * * *